US012631724B2

(12) United States Patent
Dobrev et al.

(10) Patent No.: US 12,631,724 B2
(45) Date of Patent: May 19, 2026

(54) METHOD FOR EVALUATING RADAR SYSTEMS

(71) Applicant: Symeo GmbH, Neubiberg (DE)

(72) Inventors: Yassen Dobrev, Weidenweg (DE);
Peter Georg Gulden, Erding (DE);
Mark Christmann, Unterwossen (DE);
Michael Gottinger, Buckenhof (DE)

(73) Assignee: Symeo GmbH, Neubiberg (DE)

( * ) Notice: Subject to any disclaimer, the term of this patent is extended or adjusted under 35 U.S.C. 154(b) by 526 days.

(21) Appl. No.: 17/497,910

(22) Filed: Oct. 9, 2021

(65) Prior Publication Data

US 2022/0043111 A1 Feb. 10, 2022

Related U.S. Application Data

(63) Continuation of application No. PCT/EP2020/058574, filed on Mar. 26, 2020.

(30) Foreign Application Priority Data

Apr. 10, 2019 (DE) .......................... 102019002662.4

(51) Int. Cl.
| | | |
|---|---|---|
| *G01S 7/40* | (2006.01) | |
| *G01S 13/89* | (2006.01) | |
| *G01S 13/931* | (2020.01) | |

(52) U.S. Cl.
CPC ................ G01S 7/40 (2013.01); G01S 13/89 (2013.01); G01S 13/931 (2013.01)

(58) Field of Classification Search
None
See application file for complete search history.

(56) References Cited

U.S. PATENT DOCUMENTS

| | | | | |
|---|---|---|---|---|
| 11,448,754 B2 * | 9/2022 | Cattle | ................... | G01S 13/343 |
| 2009/0066562 A1 * | 3/2009 | Altes | ................... | G01S 13/9029 |
| | | | | 342/25 F |
| 2011/0163906 A1 | 7/2011 | Yang et al. | | |
| 2013/0002488 A1 * | 1/2013 | Wang | ..................... | G01S 13/89 |
| | | | | 342/368 |
| 2014/0368374 A1 | 12/2014 | Choi et al. | | |

(Continued)

FOREIGN PATENT DOCUMENTS

| | | | | |
|---|---|---|---|---|
| CN | 106199529 | 12/2016 | | |
| CN | 106662645 A | * 5/2017 | .............. | G01S 7/41 |

(Continued)

OTHER PUBLICATIONS

EN Translation of Abstract, Description and Claims (translation via Patent Translate) of DE102017114223, 13 pages.

(Continued)

*Primary Examiner* — William Kelleher
*Assistant Examiner* — Ismaaeel A. Siddiquee
(74) *Attorney, Agent, or Firm* — Schwegman Lundberg & Woessner, P.A.

(57) ABSTRACT

The invention relates to a method for evaluating, in particular for imaging and/or for a MIMO method, a radar system comprising at least one first radar unit for emitting and receiving signals and at least one second radar unit for emitting and receiving signals, which form a total radar array, wherein only a partial radar array of the total radar array is used in the evaluation.

17 Claims, 5 Drawing Sheets

(56)                    References Cited

U.S. PATENT DOCUMENTS

Figures 1, 2:
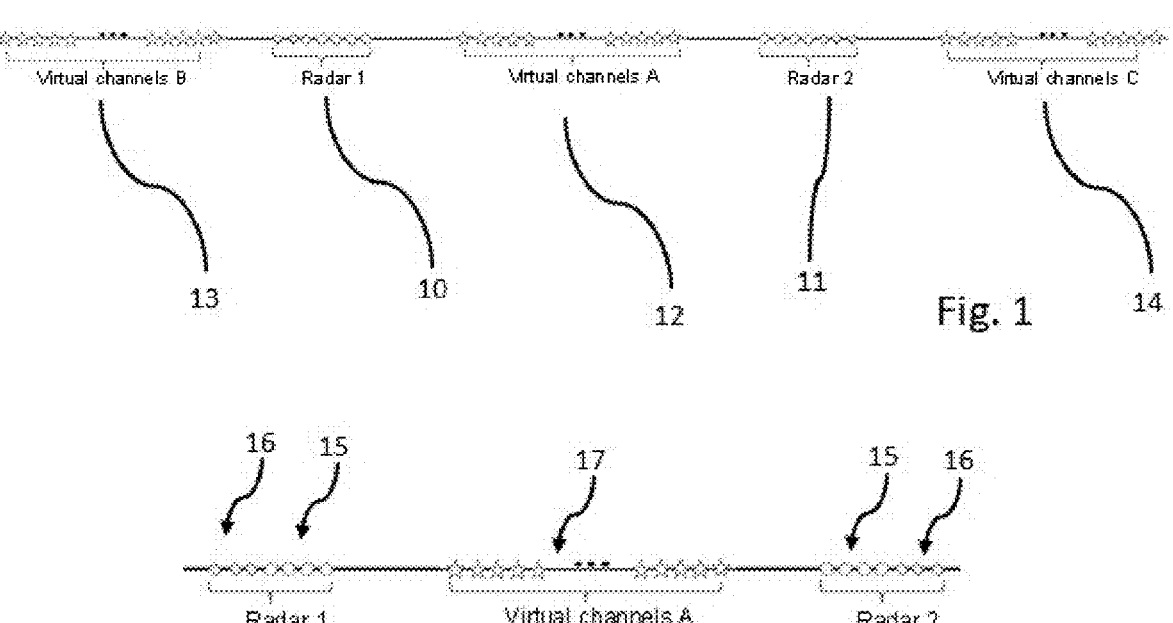

| | | |
|---|---|---|
| 2016/0146931 A1 | 5/2016 | Rao et al. |
| 2018/0149736 A1* | 5/2018 | Alland .................... H01Q 21/28 |
| 2018/0166794 A1 | 6/2018 | Raphaeli et al. |
| 2019/0079188 A1* | 3/2019 | Milschewski ......... G01S 15/878 |
| 2020/0049796 A1* | 2/2020 | Bialer ...................... G01S 13/42 |
| 2020/0081110 A1* | 3/2020 | Nam ........................ G01S 13/42 |
| 2021/0256260 A1* | 8/2021 | Kaneko .................. G01C 21/28 |

FOREIGN PATENT DOCUMENTS

| | | | |
|---|---|---|---|
| CN | 106199529 B | 8/2018 | |
| DE | 102010056532 | 12/2010 | |
| DE | 102014008785 | 12/2014 | |
| DE | 102017114223 | 12/2018 | |
| DE | 102019002662 A1 | 10/2020 | |
| JP | 2015190944 | 11/2015 | |
| WO | WO-2006124063 A2 * | 11/2006 | .............. G08G 5/80 |
| WO | 2018104468 | 6/2018 | |
| WO | WO-2020207814 A1 | 10/2020 | |

OTHER PUBLICATIONS

EN Translation of Abstract, Description and Claims (translation via Patent Translate) of JP2015190944, 10 pages.

EN Translation of Abstract, Description and Claims (translation via Patent Translate) of CN106199529, 10 pages.

International Search Report and Written Opinion issued in PCT/EP2020/058574 mailed Jun. 22, 2021, 16 pages (DE Language).

"International Application Serial No. PCT/EP2020/058574, International Preliminary Report on Patentability mailed Oct. 21, 2021", 10 pgs.

* cited by examiner

9

Virtual channels B          Radar 1          Virtual channels A          Radar 2          Virtual channels C 13                    10                          12                      11                                        14

16    15                    17                    15    16

Radar 1          Virtual channels A          Radar 2

METHOD FOR EVALUATING RADAR SYSTEMS

RELATED APPLICATION

The present disclosure claims priority to, as a bypass continuation, International Patent Application Serial No. PCT/EP2020/058574, entitled "METHOD FOR EVALUATING RADAR SYSTEMS", and filed Mar. 26, 2020. The International Patent application claims priority to German Patent Application Serial No. 102019002 662.4, entitled "Verfahren zur Auswertung von Radarsystemen", and filed on Apr. 10, 2019. The International Patent Application and the German Patent Application are is incorporated by reference in their entirety.

DESCRIPTION

The invention relates to a method and a device for the evaluation of, in particular, thinned-out radar systems.

State of the art for radar with thinned-out antenna arrangements, often referred to as sparse array, are evaluation methods e.g. according to *Hardware Realization of a 2 m×1 m Fully Electronic Real-Time mm-Wave Imaging System*, A. Schiessl, A. Genghammer, S. Ahmed, L.-P. Schmidt, EUSAR 2012 for imaging and for MiMo methods. This results in high side lobes/diffraction patterns, especially for highly thinned-out arrays, which make practical evaluation very difficult. Moreover, such arrays are often highly extended and therefore not solvable with classical beamformer approaches from the beamformer literature. Particularly often such extended Sparse Arrays occur in distributed radar systems, e.g. according to WO 2018/158281 A1, which establish coherence only in post-processing.

It is object of the invention to propose a comparatively simple and yet precise method for evaluating, in particular for imaging and/or for a Massive Input Massive Output (MIMO) method, of signals of a, in particular, thinned-out radar system. Furthermore, a corresponding evaluation device, a corresponding radar system and a corresponding mobile device shall be proposed.

This object is solved in particular by claim 1.

In particular, the object is solved by a method for evaluating (possibly for imaging and/or for a MIMO method and/or for target detection and/or -localization and/or for a target velocity determination) of signals of a, in particular, thinned-out radar system (spare radar array) and/or of a radar system with large aperture, comprising at least one first radar unit for emitting and/or receiving signals and at least one second radar unit for emitting and/or receiving signals which form a (virtual) total radar array (with antenna channels or physical channels and virtual channels), wherein only a partial radar array of the total radar array is used in (for) the evaluation.

Each radar unit may have at least two (or at least three or at least four) receiving antennas and/or at least (or at least three) two emitting antennas. Several, possibly all, antennas may be arranged on one (straight) line.

The respective radar unit may also be referred to as an emitting-receiving unit.

In total and/or between the two radar units, at least six, preferably at least twelve, possibly at least 20 virtual channels may be formed.

In embodiments, the partial radar array comprises only virtual channels.

Preferably, the referenced partial radar array is located (entirely) between the first radar unit and the second radar unit.

For the partial radar array, possibly all virtual channels between the first radar unit and the second radar unit may be considered.

Preferably, the partial radar array is selected such that a far-field approximation can be used.

At least one target is preferably in the near-field of the total radar array and/or in the far-field of the partial radar array.

Preferably, the evaluation comprises a beamforming.

Preferably, in an evaluation step it is assumed that a position of the target lies on an ellipse with the radar positions in the ellipse focal points. In particular, the ellipse is not a circle. The radar positions can be approximated by a centre point of the antennas of the respective radar unit. It is also advantageously exploited that an error in the radar position due to the curvature of the ellipse has only a minor influence (or becomes relevant only at a multiple of the wavelength).

The evaluation, in particular the beamforming, may involve the application of a window function, in particular a Hann-window.

In the evaluation, beamformer weights may be used, which may be determined beforehand, in particular calculated, possibly from hypothesis vectors, and/or may be stored, whereby in the latter case they are determined only once, in particular calculated, and are used for different radar measurements.

Preferably the evaluation, in particular the beamforming, is adapted such that it is taken into account that the far-field approximation does not apply to the total radar array, but does apply to the partial radar array.

Preferably, a/the target (with respect to cross paths formed by the first and second radar units) is at/in the same range Fast Fourier Transform (FFT) bin.

An emitting frequency of at least one emitting antenna, optionally all emitting antenna is preferably at least 1 GHz, preferably at least 10 GHz, for example 77 GHz.

The above object is further solved by an evaluation device, in particular for carrying out the above or subsequently described method, for evaluating (possibly for imaging and/or for a MIMO method and/or for target detection or localization and/or for a target velocity determination) of signals of a radar system, in particular a thinned-out radar system, comprising at least one first radar unit for emitting and receiving signals and at least one second radar unit for emitting and receiving signals which form a (virtual) total radar array (with antenna channels or physical channels and virtual channels), whereby only a partial radar array of the total radar array is used in the evaluation.

The evaluation device can have at least one (electronic) memory and/or at least one (micro)processor and/or at least one connection for current transmission and/or at least one connection for data transmission.

The above object is further solved by a radar system comprising at least one first radar unit for emitting and receiving signals and at least one second radar unit for emitting and receiving signals forming a (virtual) total radar array, and the evaluation device.

The above object is further solved by a mobile device, in particular vehicle, preferably motor vehicle and/or ship and/or aircraft, further preferably passenger vehicle or truck, comprising the evaluation device and/or the radar system. In embodiments, the first and/or second radar unit, optionally the radar system, may be arranged (integrated) in/on a bumper.

Further embodiments result from the dependent claims.

Figure 3:
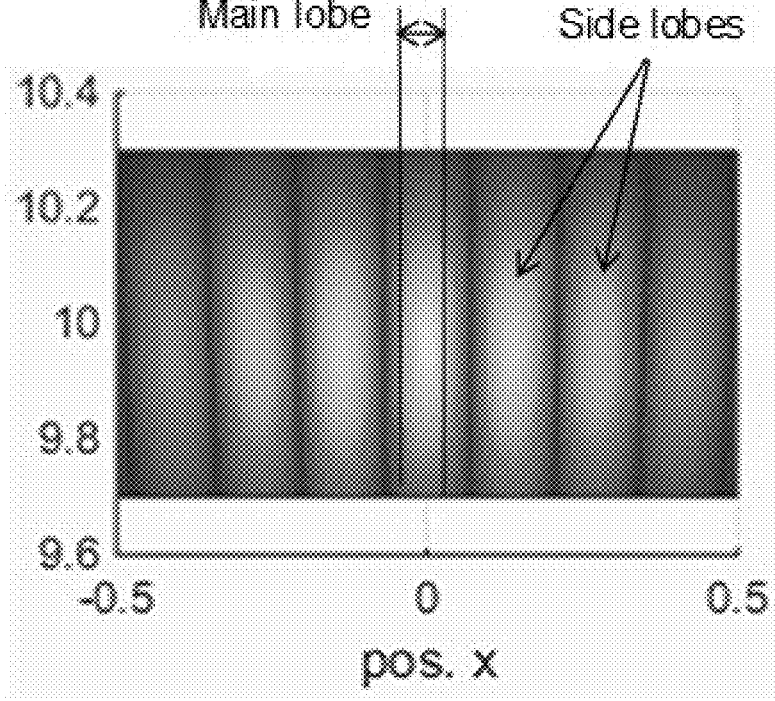
Figure 4:
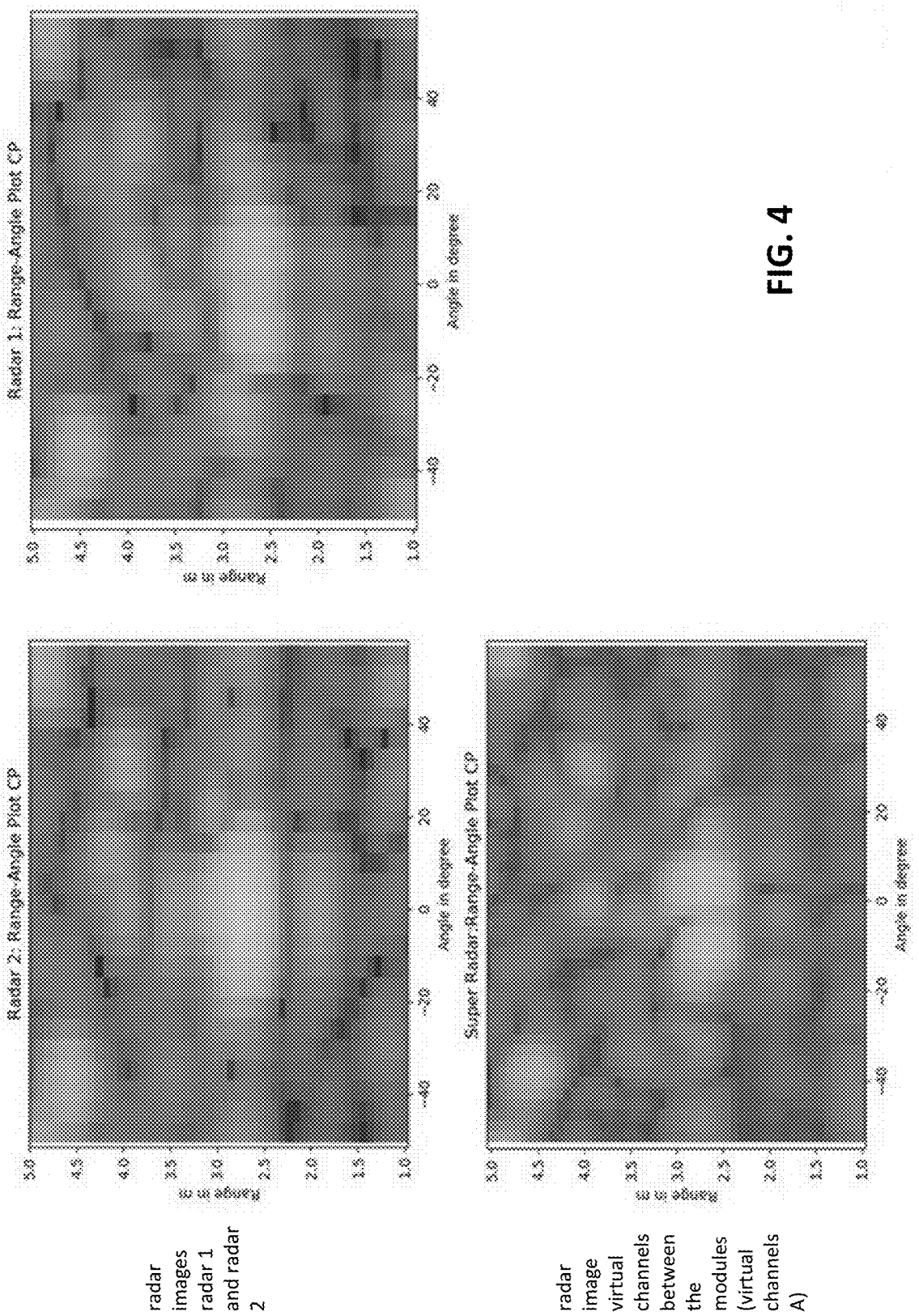
Figure 5:
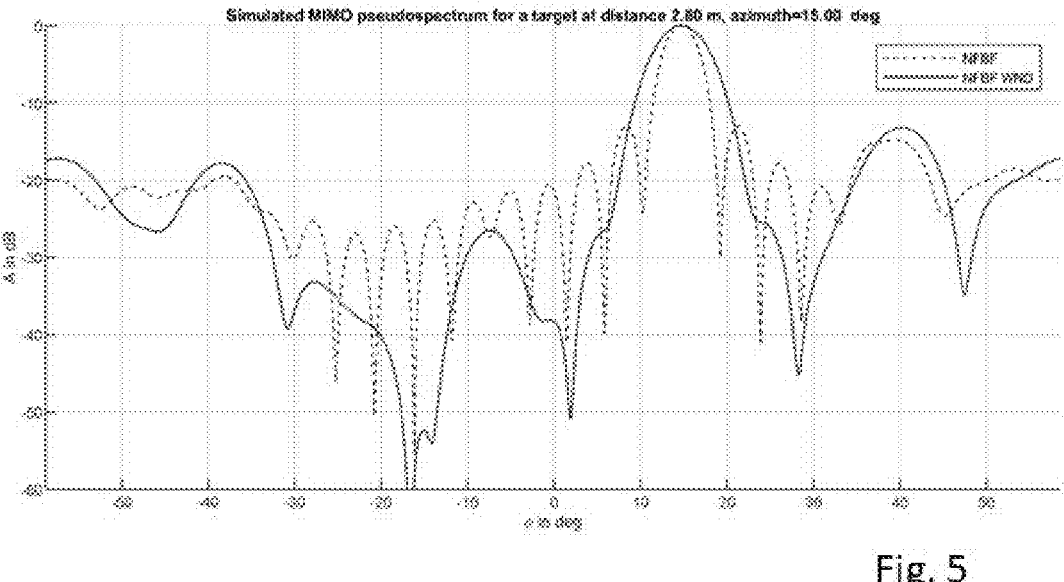
Figure 6:
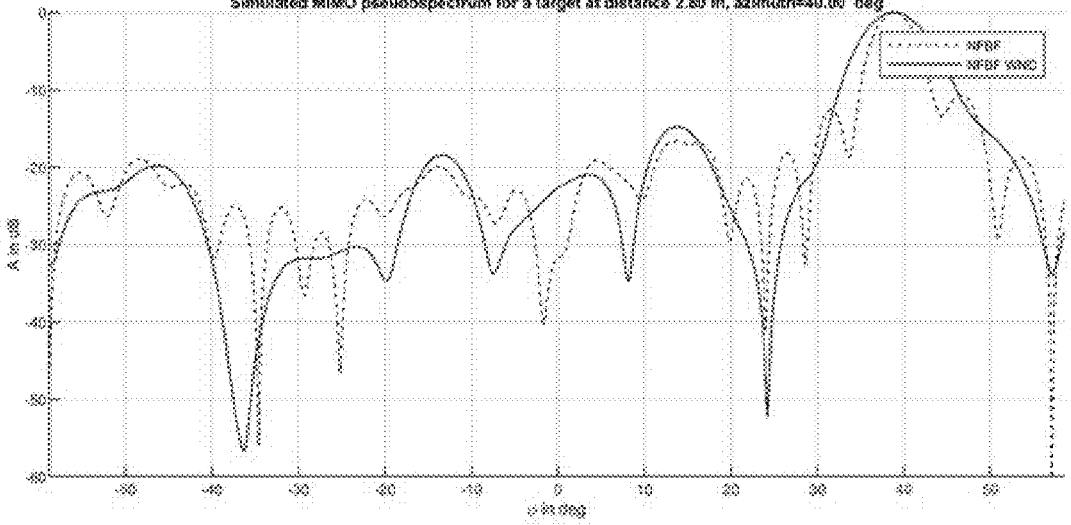
Figure 7:
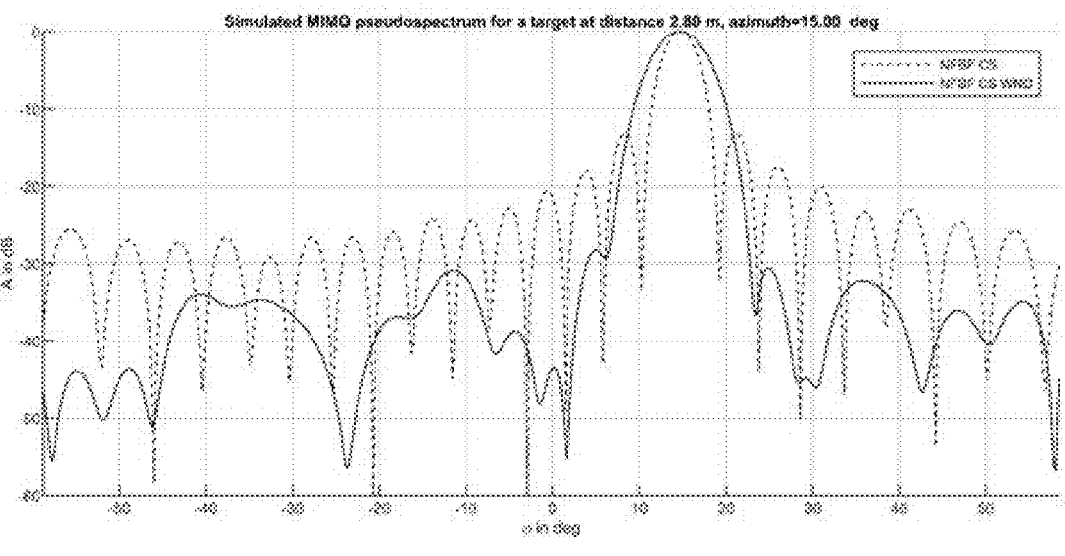
Figure 8:
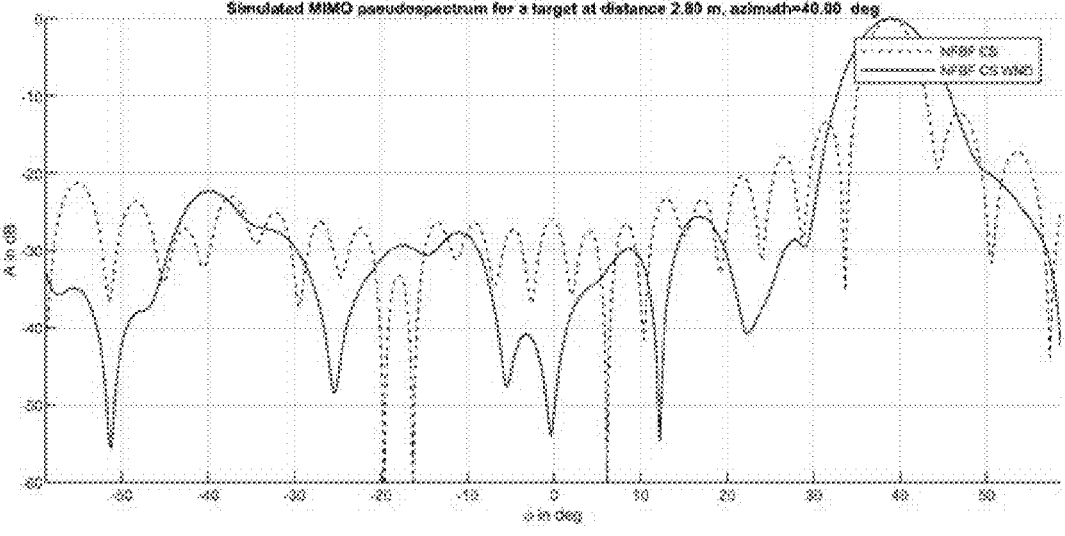

In the following description, also with reference to accompanying figures, further principles, aspects and embodiments of the invention are described. Hereby show:

FIG. 1 a schematic representation of a radar system according to the invention;

FIG. 2 a section of FIG. 1;

FIG. 3 an image with distinct side lobes;

FIG. 4 radar images;

FIG. 5 a pseudospectrum;

FIG. 6 a pseudospectrum;

FIG. 7 a pseudospectrum;

FIG. 8 a pseudospectrum;

In the following description, the same reference numerals are used for identical and like-acting parts.

FIGS. 1 and 2 show highly schematically a radar system 9 with two radar units 10 and 11, and groups of virtual channels 12, 13 and 14. The group of virtual channels 12 is arranged between the radar units 10 and 11. Each group of virtual channels may have more than the channels 17 represented by asterisks (e.g. 24 channels). The first and/or the second radar unit may have multiple (e.g. four or more) receiving antennas 15 and/or multiple (e.g. three or more) emitting antennas 16.

In a sparse array according to FIGS. 1 and 2, which may be implemented as a MIMO system with multiple emitting and receiving channels, the additional virtual channels may be represented as being realized as spatial folding as long as far-field approximation is provided. In general only from a target distance of $$r = \frac{2 \cdot L^2 \cdot f}{c},$$

a near-field approximation applies, where L is the spatial extent of the antenna aperture, f is the emitting frequency, and c is the speed of light.

In FIG. 1, it becomes clear how the real and virtual channels form a sparse array.

Typically, such arrangements have a narrow main lobe and tall and numerous side lobes. An image acquired with a very thinned-out array is shown exemplary in FIG. 3.

Preferably, from that a sub-arrangement is selected that lies between the two arrays and is less thinned-out (channel group 12 in FIG. 1). Due to the smaller extension, the achievable resolution is reduced, but the side lobes are smaller. FIG. 4 illustrates this by means of two closely spaced targets. It is easy to see that no strong sidelines occur.

Particularly advantageous in this is the use of exclusively virtual array elements in the centre of the array, since these always come to rest in the centre of the two radars due to the spatial folding of the subarrays. The relative spacing of the virtual channels in the centre thereby depends (at least substantially or at least to a first approximation) only on that of the antennas in the modules (radar units 10, 11) with respect to each other. This eliminates the necessity to exactly know the distance between the modules and if necessary to recalibrate for changes due to thermal expansion. Thus, a comparatively elaborate step compared to the state of the art is preferably omitted. Incidentally, this distance can also be inconstant, for example in the case of vibrations.

In principle, any type of beamformer can be applied to the entire array and/or to the partial array. However, in the case of extended (sparse array) antenna arrangements, the far-field approximation is no longer given due to the large extension and the high emitting and receiving frequency of, for example, 77 GHz.

In such cases, a completely holographic solution was chosen according to the state of the art, e.g. *A Rotating Synthetic Aperture Radar Imaging Concept for Robot Navigation, F. Ali, G. Bauer and M. Vossiek, IEEE TRANSACTIONS ON MICROWAVE THEORY AND TECHNIQUES*, VOL. 62, NO. 7, July 2014. Good results were obtained with this, but they are offset by a very high computational cost. Therefore, the realization as an adapted beamformer is particularly advantageous.

A holographic reconstruction is generally necessary if due to the size of the antenna array or the bandwidth used a target appears in different bins after the range FFT. Then a hypothesis has to be made for both the target frequency and the target phase, which is computationally expensive.

The advantage with the thinned-out array considered here is that even if the target is in the near-field of the total antenna arrangement, it is in the far-field of the partial apertures formed by the apertures of the two radar units. It is particularly advantageous here that the target is then at the same range FFT bin in both cross paths. This enables a computationally efficient offsetting of cross-path spectra of both radars (radar units) using a suitable beamformer. Although the classical MIMO approach cannot be applied here if the target is in the near-field of the total antenna arrangement, with the aid of the beamformer the combination of the Tx and Rx antenna arrays can be used advantageously.

The distance information for the cross-path of an arrangement consisting of two radar units constrains the position of the target to an ellipse with the radar positions at the ellipse focal points. The ellipse parameters are as follows:

The linear eccentricity is $$c = \frac{b}{2},$$

with the distance between the two radar stations b.

For a hypothetical round-trip cross-path distance $d_{hyp}$, e.g. from Tx (emitting antenna) of radar unit 10 to the target to Rx (receiving antenna) of radar unit 11 (or vice versa), the ellipse major axis is given by $$a_{hyp} = \frac{d_{hyp}}{2}.$$

The ellipse minor axis is $$b_{hyp} = \sqrt{a_{hyp}^2 - c^2}.$$

Thus, for a hypothetical azimuth angle $\varphi_{hyp}$, the hypothetical target position $p_{hyp}$ in the Cartesian coordinate system can be calculated as follows:

$$x_{hyp} = \frac{a_{hyp} \, b_{hyp} \, \tan\varphi_{hyp}}{\sqrt{a_{hyp}^2 + b_{hyp}^2 \, \tan^2\varphi_{hyp}}},$$

-continued $$y_{hyp} = \frac{a_{hyp}\, b_{hyp}}{\sqrt{a_{hyp}^2 + b_{hyp}^2\, \tan^2 \varphi_{hyp}}},$$

$$p_{hyp} = [x_{hyp},\, y_{hyp}]^T.$$

With the position $p_{Tx,n}$ of the Tx antenna n or $p_{Rx,m}$ of the Rx antenna m, the round-trip distance from the respective Tx antenna to the target and from the target to the respective Rx antenna can be calculated to be $$d_{n,m} = \|p_{Tx,n} - p_{hyp}\|_2 + \|p_{Rx,m} - p_{hyp}\|_2,$$

with the Euclidean distance $\|\cdot\|_2$. With the ramp start frequency and bandwidth $f_0$ and B, or the speed of light $c_0$, the phase hypothesis $\phi_{hyp}$ can be calculated:

$$\phi_{hyp}(d_{hyp}, \varphi_{hyp}) = 2\pi \frac{f_0 + 0.5\,B}{c_0} d_{n,m}.$$

The term 0.5B accounts for the influence of a (FMCW-) bandwidth on the phase.

The elements of the hypothesis vector can then be calculated as follows:

$$h_{m,n}(d_{hyp}, \varphi_{hyp}) = \exp(-j\phi_{hyp}(d_{hyp}, \varphi_{hyp})).$$

The radar image $I(d_{hyp},\varphi_{hyp})$ results from the comparison of the hypothesis with the measurement $s_{m,n}(d_{hyp})$:

$$I(d_{hyp}, \varphi_{hyp}) = \sum_{n=1}^{N} \sum_{m=1}^{M} s_{m,n}(d_{hyp}) h_{m,n}(d_{hyp}, \varphi_{hyp})$$

A simulation result is shown in FIGS. 5 and 6 for a target in the near-field at 15° and 40°, respectively, as "NFBF". If one extends the beamforming by a window w (e.g., a Hann-window)

$$I_{wnd}(d_{hyp}, \varphi_{hyp}) = \sum_{n=1}^{N} \sum_{m=1}^{M} s_{m,n}(d_{hyp}) h_{m,n}(d_{hyp}, \varphi_{hyp}) w_{m,n},$$

one obtains the spectrum "NFBF WND". As can be seen, the window reduces the sidelobes in some parts of the spectrum. However, the remaining sidelobes of up to −15 dB are impermissibly high for imaging applications. This is because the combination of the two partial apertures does not produce a fully populated uniform linear array (ULA), but a thinned-out array.

To reduce the sidelobe level, optimization of the beamformer weights can be performed as described, for example, in P. Gerstoft, A. Xenaki, and C. F. Mecklenbräuker, "Multiple and single snapshot compressive beamforming," *The Journal of the Acoustical Society of America*, vol. 138, no. 4, pp. 2003-2014, October 2015. This corresponds to a simple non-iterative compressed sensing approach or least-squares optimization.

If one combines the hypotheses for a distance and all angles into a matrix H, the optimized weights $H_o$ can be calculated as follows:

$$H_o = H(H^H H + \mu I),$$

with the regularization parameter μ and the unit matrix I. The optimized weights are independent of the measured data. Therefore, they can be calculated and stored only once and then applied to each measurement. The computational effort of applying the optimized beamformer is consequently equal to that of the simplest delay-and-sum beamformer.

The result of applying the optimized weights is shown in FIGS. 7 and 8 as "NFBF CS" for a target in the near-field at 15° and 40°, respectively. As can be seen, by this the side lobes far from the main peak are reduced to about −25 dB. An additional windowing, e.g., with the Hann-window, results in a further reduction of the sidelobes to −35 dB at the expense of widening the main lobe.

Key points of the invention are:

1) Use of subarrays with better overall characteristics than the main array.

2) Calculation of subarrays with matched beamformer that a) takes into account that the far-field approximation does not apply to the total aperture and b) that the far-field approximation applies to a partial aperture.

These key points are considered independent and claimed solutions to the above object and may optionally be combined with features from one or more of the appended claims and/or the above description.

At this point, it should be noted that all of the above-described parts are claimed as essential to the invention when considered alone and in any combination, especially the details shown in the drawings. Modifications thereof are familiar to those skilled in the art.

LIST OF REFERENCE SIGNS

9 radar system
10 first radar unit
11 second radar unit
12 group of virtual channels
13 group of virtual channels
14 group of virtual channels
15 emitting antenna
16 receiving antenna
17 virtual channel

The invention claimed is:

1. A method for evaluation of signals for imaging and/or for a multi-input-multi-output (MIMO) method, in a radar system, the radar system comprising at least one first radar unit for emitting and receiving signals and at least one second radar unit for emitting and receiving signals which form a total radar array, wherein the method comprises:

selecting a partial radar array of the total radar array for the evaluation of signals for the imaging and/or for the MIMO method such that a hypothetical target falls into a same Fast Fourier Transform (FFT) range bin for partial apertures of the at least one first radar unit and the at least one second radar unit, corresponding to the partial radar array;

wherein at least one target being evaluated is in a near-field region with respect to the total radar array and in a far-field region with respect to the partial radar array; and wherein the evaluation comprises beamforming, the beamforming taking into account that a far-field approximation applies with respect to the partial array and does not apply with respect to the total array.

2. The method according to claim 1, wherein the partial radar array used is located between the first and second radar units.

3. The method according to claim 1, wherein the evaluation comprises applying a constraint that a position of a target is on an ellipse with positions of the first and second radar units located at focal points of the ellipse.

4. The method according to claim 1, wherein the beamforming comprises applying a window function.

5. The method according to claim 4, wherein the window function is a Hann window.

6. The method according to claim 1, wherein the beamforming comprises determining beamformer weights.

7. The method according to claim 6, wherein the beamformer weights are determined from hypothesis vectors.

8. The method according to claim 6, wherein the beamformer weights are stored.

9. The method according to claim 8, wherein the beamformer weights are determined once and are used for different radar measurements.

10. The method according to claim 1, wherein a far-field approximation does not apply to a range of the hypothetical target in relation to the total radar array, but does apply to a range of the hypothetical target in relation to the partial radar array.

11. The method according to claim 1, wherein the hypothetical target is in cross paths formed by the first and second radar units corresponding to a same FFT range bin.

12. A system comprising an evaluation device, for evaluating signals, for imaging and/or for a multi-input-multi-output (MIMO) method, in a radar system, the radar system comprising at least one first radar unit for emitting and receiving signals and at least one second radar unit for emitting and receiving signals which form a total radar array, wherein the evaluation device is configured to perform evaluation by selecting a partial radar array of the total radar array;

wherein the partial radar array is selected such that a hypothetical target falls into a same Fast Fourier Transform (FFT) range bin for partial apertures of the at least one first radar unit and the at least one second radar unit, corresponding to the partial radar array;

wherein at least one target being evaluated is in a near-field region with respect to the total radar array and in a far-field region with respect to the partial radar array; and wherein the evaluation comprises beamforming, the beamforming taking into account that a far-field approximation applies with respect to the partial array and does not apply with respect to the total array.

13. The system of claim 12, wherein the evaluation device is configured to perform beamforming.

14. The system of claim 12, wherein the partial radar array is located between the first and second radar units.

15. The system of claim 12, wherein a far-field approximation does not apply to a range of the hypothetical target in relation to the total radar array, but does apply to a range of the hypothetical target in relation to the partial radar array.

16. The system of claim 12, wherein the evaluation device is housed on or within a vehicle.

17. The system of claim 16, wherein the at least one first radar unit for emitting and receiving signals and the at least one second radar unit for emitting and receiving signals are housed on or within the vehicle.

* * * * *